United States Patent
Laube et al.

(10) Patent No.: US 12,407,157 B2
(45) Date of Patent: *Sep. 2, 2025

(54) SUPPORT CABLE AND AUDIO CABLE SPLICE HOUSING

(71) Applicant: Biamp Systems, LLC, Beaverton, OR (US)

(72) Inventors: Douglas Laube, Plano, TX (US); Charles D. Gollnick, Sherwood, OR (US); Dale Irving, Oregon City, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,109

(22) Filed: Apr. 10, 2024

(65) Prior Publication Data

US 2024/0258785 A1   Aug. 1, 2024

Related U.S. Application Data

(63) Continuation of application No. 17/129,877, filed on Dec. 21, 2020, now Pat. No. 11,984,713.

(60) Provisional application No. 62/950,910, filed on Dec. 19, 2019.

(51) Int. Cl.
*H02G 15/113* (2006.01)
*H02G 15/16* (2006.01)

(52) U.S. Cl.
CPC ................. *H02G 15/113* (2013.01)

(58) Field of Classification Search
CPC .. G02B 6/4441; G02B 6/4446; G02B 6/4447; G02B 6/4448; G02B 6/4454; G02B 6/4444; H02G 15/113; H02G 15/16; H02G 3/08
See application file for complete search history.

(56) References Cited

U.S. PATENT DOCUMENTS

| | | | |
|---|---|---|---|
| 3,757,031 A * | 9/1973 | Izraeli | H02G 15/113 138/155 |
| 4,420,211 A * | 12/1983 | Ledbetter | H01R 12/616 439/408 |
| 4,722,701 A | 2/1988 | Bradt | |
| 5,684,911 A | 11/1997 | Burgett | |
| 7,688,986 B2 | 3/2010 | Ito et al. | |
| 7,995,768 B2 | 8/2011 | Miki et al. | |
| 8,265,298 B2 | 9/2012 | Ito et al. | |
| 8,428,236 B2 | 4/2013 | Smaak et al. | |
| 9,544,687 B2 | 1/2017 | Srinivasan et al. | |
| 11,575,990 B2 | 2/2023 | Herbig et al. | |
| 2005/0105743 A1 | 5/2005 | Faltesek et al. | |
| 2006/0165242 A1 | 7/2006 | Miki et al. | |
| 2010/0316348 A1* | 12/2010 | Lapp | G02B 6/4471 385/137 |
| 2011/0280535 A1 | 11/2011 | Womack | |

(Continued)

*Primary Examiner* — Timothy J Thompson
*Assistant Examiner* — Amol H Patel (57) ABSTRACT

Example embodiments provide a device that includes one or more of a first half-shell portion of an oval-shaped prism housing including one or more protrusions and one or more receiving slots, and a second half-shell portion of the oval-shaped prism housing including one or more additional protrusions and one or more additional receiving slots, and a number of cable splicer lanes configured to support corresponding cable splicers.

20 Claims, 6 Drawing Sheets

(56) References Cited

U.S. PATENT DOCUMENTS

| | | |
|---|---|---|
| 2014/0270200 A1 | 9/2014 | Usher et al. |
| 2015/0056847 A1 | 2/2015 | Liu et al. |
| 2015/0144394 A1* | 5/2015 | Webb ..................... H02G 1/14 |
| | | 174/658 |
| 2015/0296289 A1 | 10/2015 | Lakkundi et al. |
| 2015/0355427 A1 | 12/2015 | Hsing |
| 2015/0371529 A1 | 12/2015 | Dolecki |
| 2016/0064002 A1 | 3/2016 | Kim et al. |
| 2016/0141857 A1 | 5/2016 | Palmer et al. |
| 2016/0163329 A1 | 6/2016 | Son et al. |
| 2016/0353218 A1 | 12/2016 | Starobin et al. |
| 2019/0214003 A1 | 7/2019 | Kobayashi et al. |
| 2020/0105295 A1 | 4/2020 | Sereshki et al. |
| 2021/0235189 A1 | 7/2021 | Secall et al. |
| 2021/0297518 A1 | 9/2021 | Keum et al. |

* cited by examiner

SUPPORT CABLE AND AUDIO CABLE SPLICE HOUSING

CROSS-REFERENCE TO RELATED APPLICATIONS

This application is a continuation of U.S. patent application Ser. No. 17/129,877, filed on Dec. 21, 2020, which claims the benefit of U.S. Provisional Application No. 62/950,910, filed on Dec. 19, 2019, the entire contents of which are hereby incorporated by reference.

BACKGROUND OF THE INVENTION

Audio product installation requires support cables and audio cables to be spliced together seamlessly and without leaving cables exposed to the environment. A housing may provide an aesthetic finished product appearance. Although, a housing may be customized to integrate support cable splices and audio cable (data cable) splices for quick installation and an aesthetic finished product appearance, the relative level of difficulty required to connect a housing for multiple splice junctions can limit the usefulness of a housing.

SUMMARY OF THE INVENTION

The present application relates to a device including a first half-shell portion of an oval-shaped prism housing having one or more protrusions and one or more receiving slots, a second half-shell portion of the oval-shaped prism housing having one or more protrusions and one or more receiving slots, and a plurality of cable splicer mountings configured to support a plurality of cable splicers.

One example embodiment may include an apparatus that includes a first half-shell portion of an oval-shaped prism housing including one or more protrusions and one or more receiving slots, and a second half-shell portion of the oval-shaped prism housing comprising one or more additional protrusions and one or more additional receiving slots, and a plurality of cable splicer lanes configured to support a corresponding plurality of cable splicers.

Another example embodiment may include an apparatus that includes a first half-shell portion of an oval-shaped prism housing including one or more protrusions and one or more receiving slots, and a second half-shell portion of the oval-shaped prism housing comprising one or more additional protrusions and one or more additional receiving slots, and a plurality of cable splicer lanes each of which includes mount channels configured to support a corresponding plurality of cable splicers.

Another example embodiment may include an apparatus that includes an oval-shaped prism housing including one or more protrusions and one or more receiving slots, and a plurality of cable splicer lanes configured to support a plurality of cable splicers, wherein the plurality of cable splicer lanes each comprise a plurality of mount channels and a plurality of mount sets contiguous with each of the mount channels, and each mount channel includes a forcibly collapsible material configured to receive and secure a corresponding cable splicer, and wherein the plurality of mounts sets each comprise a plurality of V-shaped mounts.

DETAILED DESCRIPTION

Example embodiments include housing configurations for an oval-shaped prism housing that can be installed around a set of cable splicers for an integrated configuration and aesthetic appearance.

Figure 1:
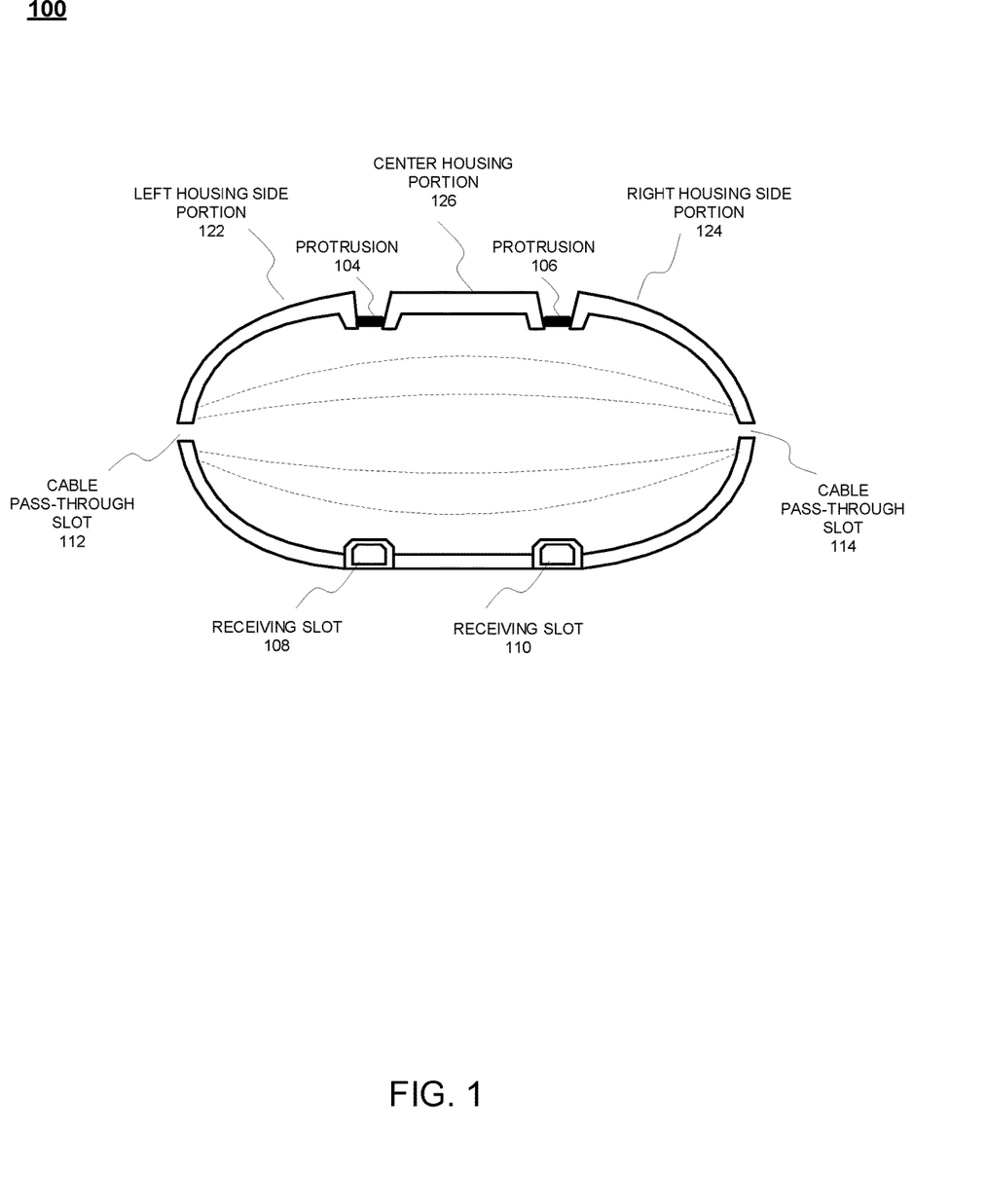
FIG. 1 illustrates a half-shell portion of an oval-shaped prism cable splice housing according to example embodiments.

FIG. 1 illustrates a half-shell portion of an oval-shaped prism cable splice housing according to example embodiments. Referring to FIG. 1, the portion 100 of the housing illustrates a universal half-shell portion of the housing which can snap-in to another half-shell to make a completed housing that covers a set of cable splicers permitting cables to enter and be connected via the splice intersections. The half-shell portion 100 includes a center housing portion 126 as a solid relatively smooth area of material (plastic, metal, etc.), right and left side portions 124/122 which slope downward, pass-through slots 112 and 114 for cables to pass-through, into and out of, the housing, and a set of protrusions 104/106 and receiving slots 108/110. The second half of the housing may be the same or substantially similar configuration and may be universally attached in an opposite position so the protrusions 104/106 of one half of the shell housing can be affixed to the receiving slots 108/110 of a second half of the shell housing.

Figure 2:
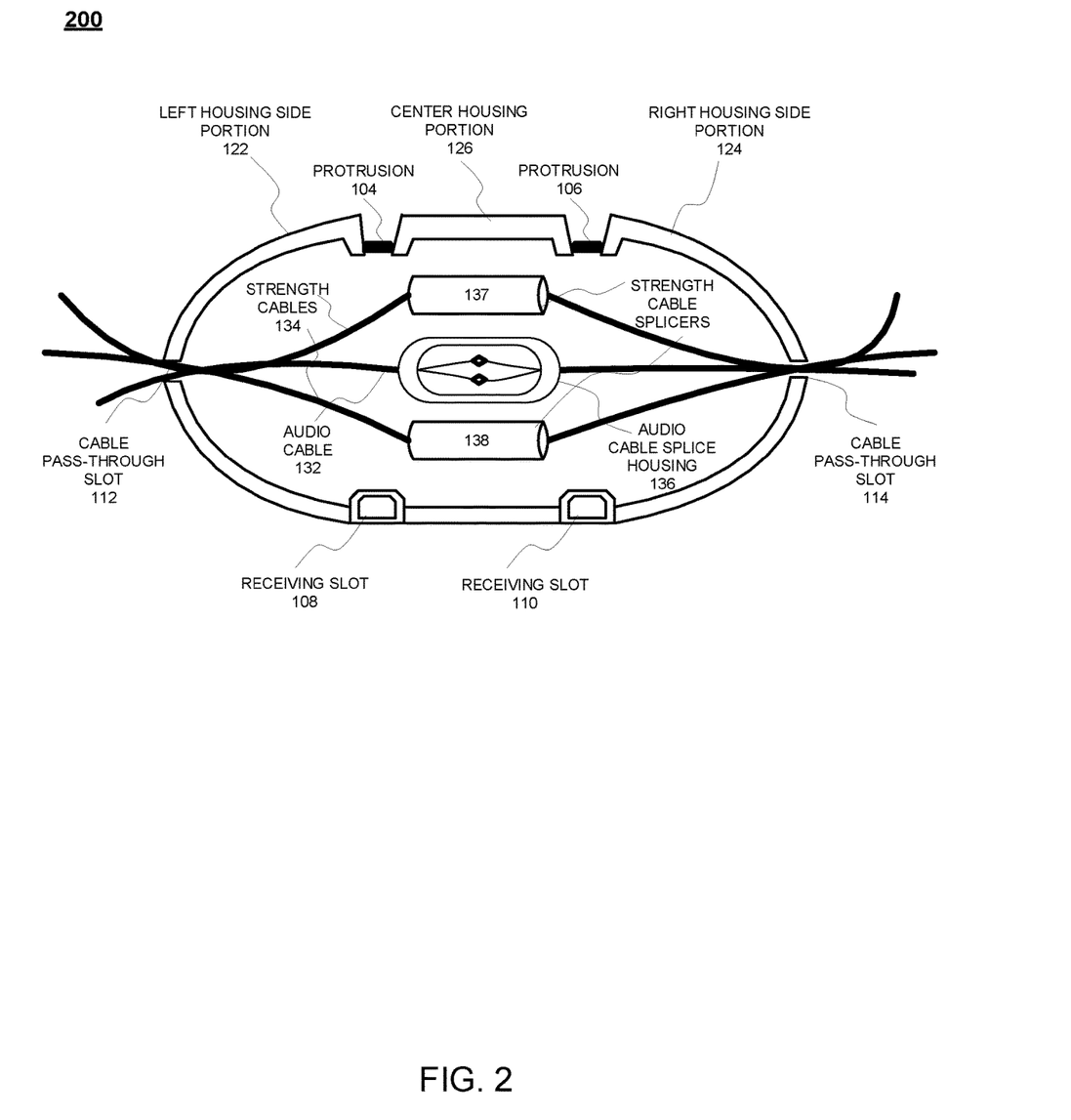
FIG. 2 illustrates a half-shell portion of an oval shaped-prism cable splice housing with cable splicers disposed inside the housing according to example embodiments.

FIG. 2 illustrates a half-shell portion of an oval shaped-prism cable splice housing with cable splicers disposed inside the housing according to example embodiments. Referring to FIG. 2, in an ideal scenario, the housing configuration 200 would hold two strength cable splicers 137 and 138 and a single audio cable (two-wire) splicer 136. The strength cables 134 may be metal wire cables, such as aluminium or steel cables that are spliced with additional cables via the splicers 137/138 that have receiving slots on both ends to lock in the two sides of the metal cable so they effectively become one cable. The audio cable splicer 'housing' 136 may have a pair of splicers for a dual cable audio cable 132 to match wires on both ends of the audio cable.

Figure 3:
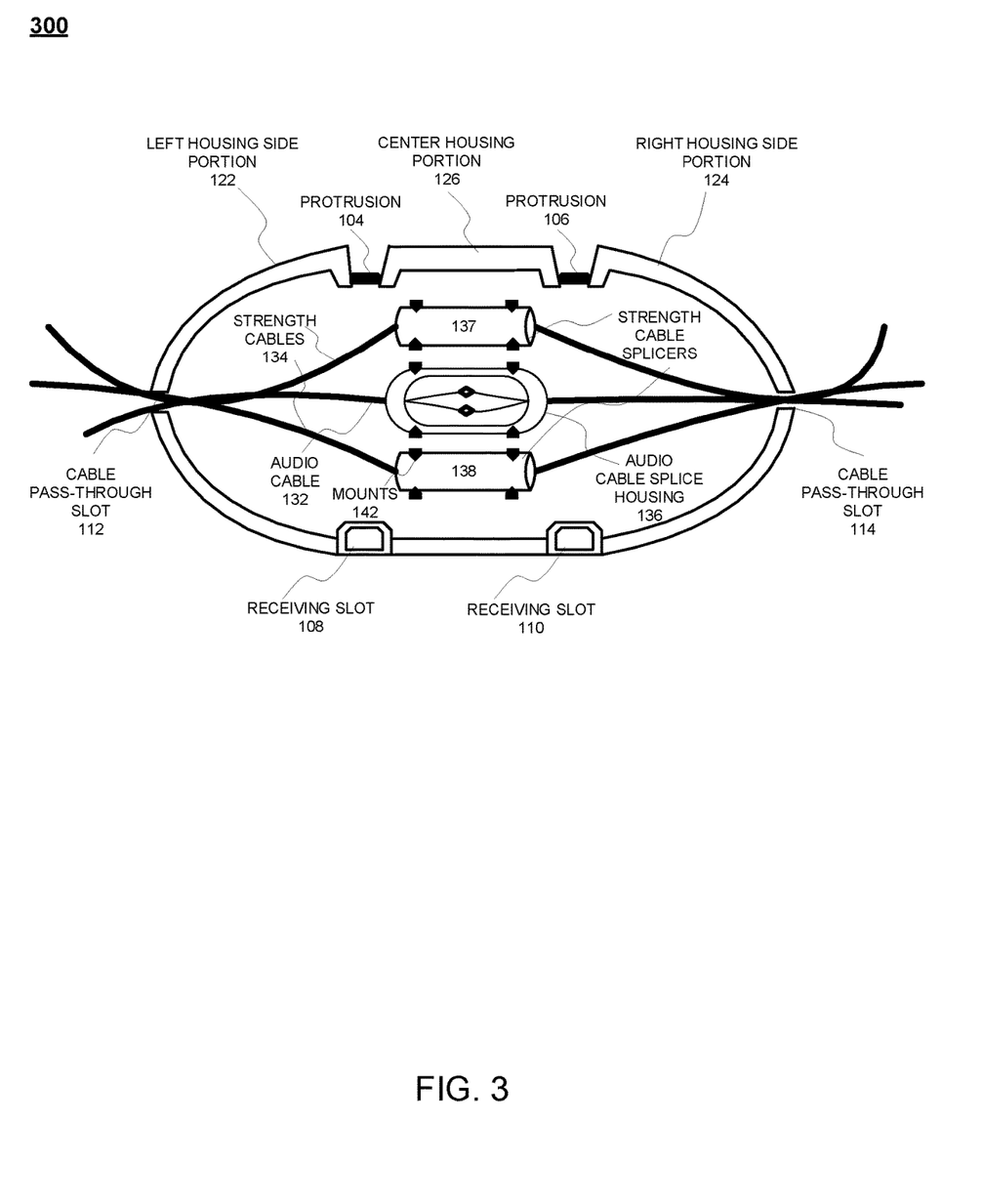
FIG. 3 illustrates a half-shell portion of an oval-shaped prism cable splice housing with cable splicers mounted to an interior wall of the housing according to example embodiments.

FIG. 3 illustrates a half-shell portion of an oval-shaped prism cable splice housing with cable splicers mounted to an interior wall of the housing according to example embodiments. According to example embodiments, with reference to FIG. 3, the configuration 300 provides a scenario where the cable splicers 136-138 are integrated into the housing interior wall surface via mounts 142 which are either a different material from the housing material, which may include metal, plastic, etc., or a same material for ease of manufacturing. The mounts may be affixed in groups of two or four or more and with an ideal set of three different mount sets of mounts 142 to mount the cable splicers to the housing interior wall and the audio cable to the housing interior wall. The mounts 142 may be affixed to one half of the cable housing, while the other half is empty and is snapped into the first half to secure the mounted cable splicers inside the housing body. As an alternative to mounts 142, the cable splicers may be snapped-fitted into channels which are designed to provide a securing slot for the length of the housings, such as one channel per housing. Channels are described in further detail with reference to FIG. 5.

Figure 4A:
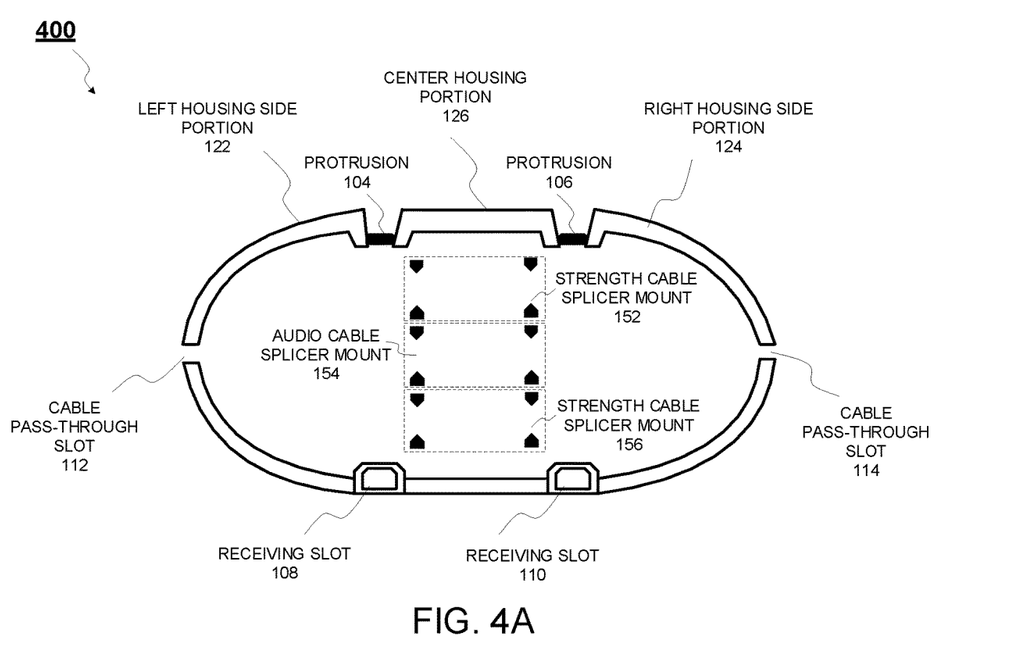
FIG. 4A illustrates a half-shell portion of an oval-shaped prism cable splice housing with mounts disposed on the interior wall of the housing according to example embodiments.

FIG. 4A illustrates a half-shell portion of an oval-shaped prism cable splice housing with mounts disposed on the interior wall of the housing according to example embodiments. Referring to FIG. 4A, the configuration 400 illustrates the three cable splicer mount sets 152, 154 and 156, each of which has four mounts to secure the splicers into position against the interior wall of the housing of the first shell-half of the housing. The four mounts in each splicer mount configurations may be considered a 'mount set'. The areas where each of the splicers are mounted may be considered cable splicer lanes and the mounts may be contiguous with a mount channel in each of the lanes so that the forcibly collapsible material can provide a spring coefficient to the sides of the splicer laid in each lane. The walls of the channels pressing on the splicers and the mounts can provide two forms of securement for keeping the splicers in position against the wall of the first half-shell.

Figure 4B:
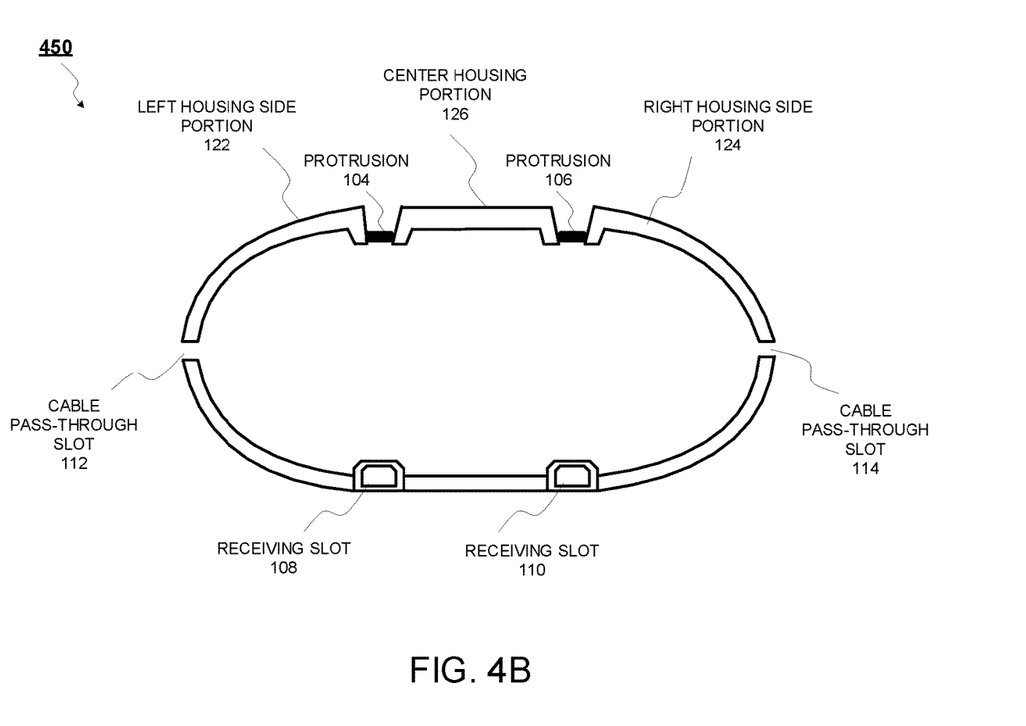
FIG. 4B illustrates a half-shell portion of an oval-shaped prism cable splice housing without mounts disposed on the interior wall of the housing according to example embodiments.
Figure 6:
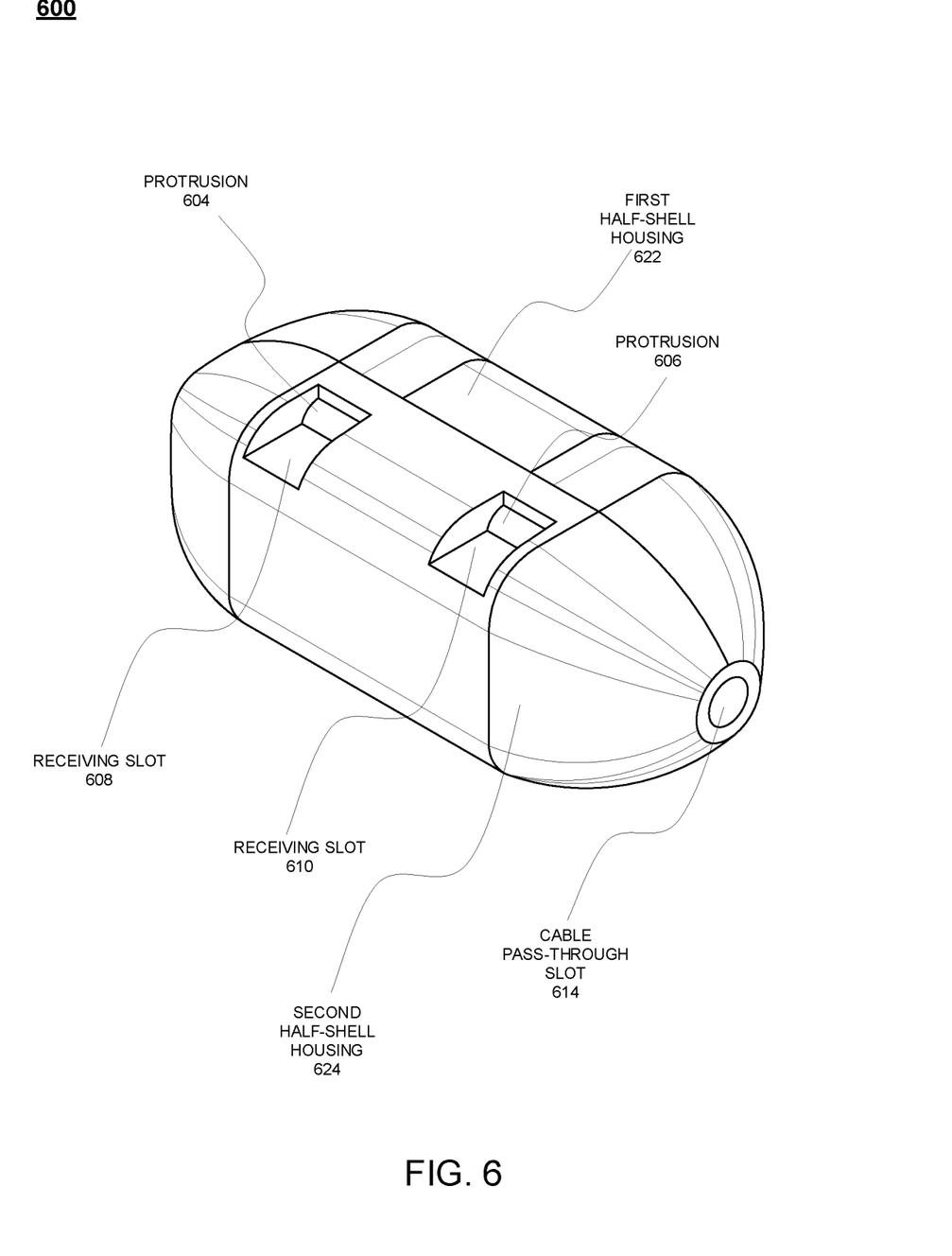
FIG. 6 illustrates a schematic illustration of the closed oval-shaped prism cable splice housing according to example embodiments.

FIG. 4B illustrates a half-shell portion of an oval-shaped prism cable splice housing without mounts disposed on the interior wall of the housing according to example embodiments. Referring to FIG. 4B, the configuration provides an empty second half of the shell housing 450. The second half may be universally compatible with the first half so the two halves can be joined together to form an oval-shaped prism as illustrated in FIG. 6. Both sides are not required to have securing mechanisms.

Figure 5:
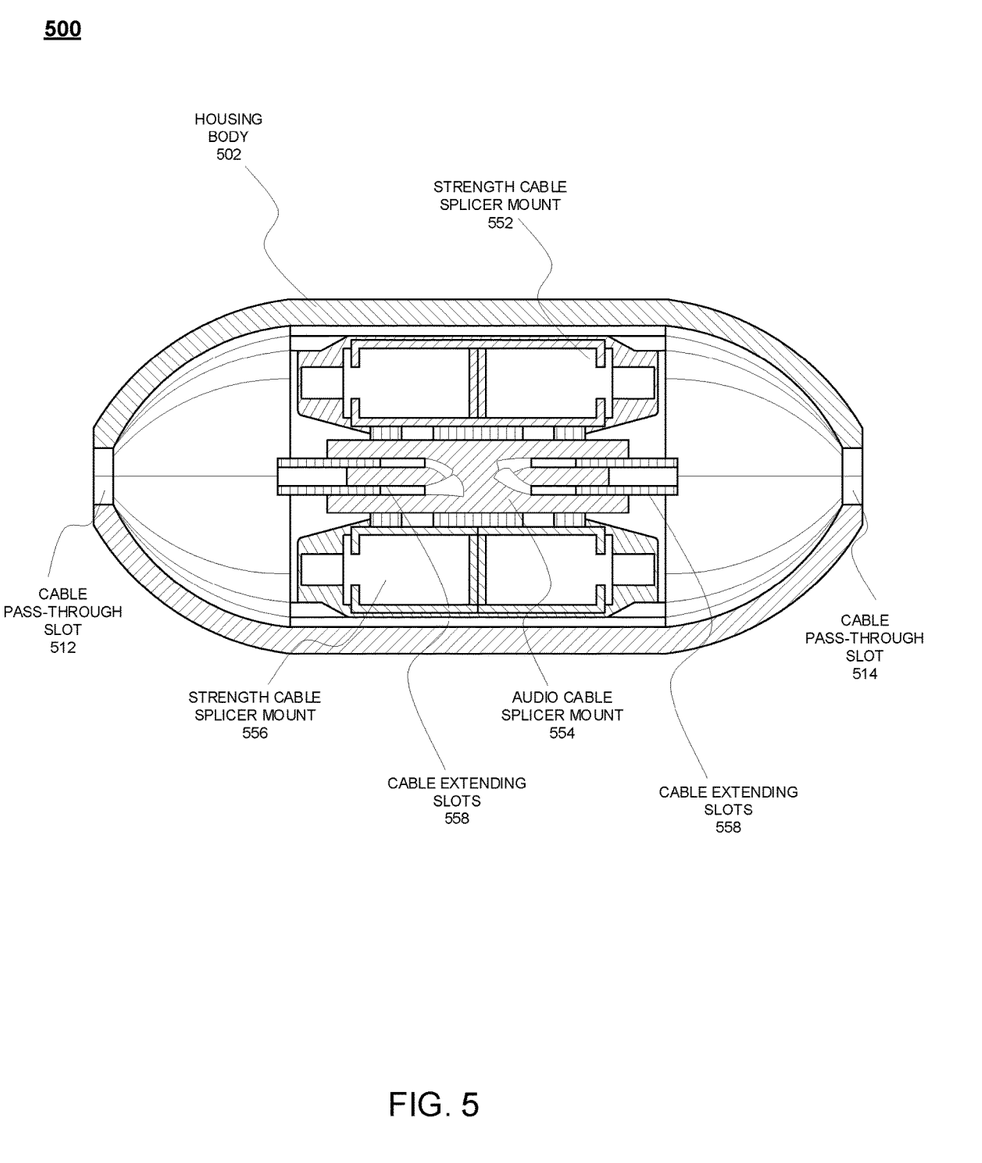
FIG. 5 illustrates a schematic illustration of a half-shell portion of the oval-shaped prism cable splice housing with the cable splicers installed on the interior wall of the housing according to example embodiments.

FIG. 5 illustrates a schematic illustration of a half-shell portion of the oval-shaped prism cable splice housing with the cable splicers installed on the interior wall of the housing according to example embodiments. Referring to FIG. 5, the configuration 500 illustrates a schematic of the first half of the oval-shaped prism with a housing body 502, a pair of pass-through slots 512/514 for cables to pass into and out of the housing body 502, and a set of three cable splicers 552, 554 and 556 which are mounted to an interior wall of one half of the housing. Instead of mounts, the alternatives may include a set of plastic-formed channels/lanes as part of the splicer bodies 552-556 which are disposed against the wall material of the housing body for a substantial portion of a length of one side of the housing. The channels/lanes may be sized correctly to permit the splicers to be forced into a secured and locked position. In another example, the lanes may be on both sides of the housing to permit the splicers to be locked on either side of the housing to permit additional splicers to be included in the housing. The lanes may be a forcibly collapsible material that secure the splicer, once snapped-into position inside the lane(s)/channel(s). Also, cable extending slots 558 may have its own cable connecting both sides of the slots so speaker wire can easily be pushed into the channel slots on both sides to electrically connect and splice the wires on both ends or the audio cable channel or second channel.

FIG. 6 illustrates a schematic illustration of the closed oval-shaped prism cable splice housing according to example embodiments. Referring to FIG. 6, the schematic 600 provides an illustration of a completed housing where the two halves are joined together to form a completed oval-shaped prism housing with a first half-shell 622 locked into position with a second half-shell 624 together which form a completed housing. In practice, the housing will be generally about one inch in width and two to three inches in length. The receiving slots 608 and 610 may be on both sides of the housing halves disposed in opposite positions with respect to one another so the protrusions 604 and 606 can pass through and lock against a surface lip of the receiving slots via a lip on the protrusions. Also, pass-through slots 614 are provided for the cables to enter and exit the housing.

One example apparatus may include a first half-shell portion of an oval-shaped prism housing having one or more protrusions and one or more receiving slots, and a second half-shell portion of the oval-shaped prism housing including one or more additional protrusions and one or more additional receiving slots, and a plurality of cable splicer lanes configured to support a corresponding plurality of cable splicers. The first half-shell and the second half-shell are configured to lock together to form the oval-shaped prism housing, and the locked position provides the one or more protrusions to be secured in the one or more additional receiving slots and the one or more additional protrusions being secured in the one or more receiving slots.

The first half-shell may also include a plurality of mount sets disposed in the corresponding plurality of cable splicer lanes, so each mount set includes a plurality of mounts configured to receive and secure a corresponding plurality of cable splicers. The v-shaped mount lips provide a resting lip for the splicer in that particular mount set of mounts. The mounts may have other shapes for the lips to secure the splicers. The walls of the channels also provide a securing surface via a flexible plastic. Each of the plurality of mounts sets comprises generally two or three or more mounts. The first half-shell includes a plurality of mount channels disposed in the corresponding plurality of cable splicer lanes, and each mount channel includes the forcibly collapsible material configured to receive and secure a corresponding cable splicer. The plurality of mount channels includes three mount channels for receiving three respective cable splicers.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be configured with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., materials, shapes, sizes, etc.) thereto.

What is claimed is:

1. An apparatus comprising:
a housing comprising:
a first half-shell portion comprising one or more protrusions and one or more receiving slots;
a second half-shell portion comprising one or more additional protrusions and one or more additional receiving slots, wherein the one or more protrusions and one or more receiving slots cooperate with the one or more additional protrusions and one or more additional receiving slots to secure the first half-shell portion and the second half-shell portion in a closed configuration; and
a plurality of splicer receiving portions affixed to an interior of the housing, wherein one or more first splicer receiving portions of the plurality of splicer receiving portions receive a cable splicer of a first type for a strength cable, and one or more second splicer receiving portions of the plurality of splicer receiving portions receive a cable splicer of a second type, which is different than the first type, for an audio cable.

2. The apparatus of claim 1, wherein the housing has a generally oval configuration.

3. The apparatus of claim 1, wherein the one or more first splicer receiving portions comprise only two first splicer receiving portions and the one or more second splicer receiving portions comprise only a single second splicer receiving portion.

4. The apparatus of claim 1, wherein the plurality of splicer receiving portions are affixed in only one of the first half-shell portion or the second half-shell portion.

5. The apparatus of claim 1, wherein the plurality of splicer receiving portions are affixed in the first half-shell portion and the second half-shell portion.

6. The apparatus of claim 1, wherein the splicer receiving portions are one or more of:
a mount set or a flexible channel.

7. An apparatus comprising:
a housing comprising:
a first half-shell portion having one or more protrusions and one or more receiving slots;
a second half-shell portion having one or more additional protrusions and one or more additional receiving slots, wherein the one or more protrusions and one or more receiving slots cooperate with the one or more additional protrusions and one or more additional receiving slots to secure the first half-shell portion and the second half-shell portion in a closed configuration; and
a plurality of resilient mounting channels affixed to an interior of the housing, wherein one or more first resilient mounting channels of the plurality of resilient mounting channels receive a cable splicer of a first type for a strength cable, and one or more second resilient mounting channels of the plurality of resilient mounting channels receive a cable splicer of a second type, which is different than the first type, for an audio cable.

8. The apparatus of claim 7, wherein the housing has a generally oval configuration.

9. The apparatus of claim 7, wherein the one or more first resilient mounting channels comprise only two first resilient mounting channels and the one or more second resilient mounting channels comprise only a single second resilient mounting channel.

10. The apparatus of claim 7, wherein the plurality of resilient mounting channels are affixed in only one of the first half-shell portion or the second half-shell portion.

11. The apparatus of claim 7, wherein the plurality of resilient mounting channels are affixed in the first half-shell portion and the second half-shell portion.

12. The apparatus of claim 7, wherein the plurality of resilient mounting channels are integrally formed with the cable splicer of the first type or the cable splicer of the second type.

13. An apparatus comprising:
a housing comprising:
a first half-shell portion having one or more protrusions and one or more receiving slots;
a second half-shell portion having one or more additional protrusions and one or more additional receiving slots, wherein the one or more protrusions and one or more receiving slots cooperate with the one or more additional protrusions and one or more additional receiving slots to secure the first half-shell portion and the second half-shell portion in a closed configuration; and
a plurality of resilient mounting channels affixed to an interior of the housing, wherein one or more first resilient mounting channels of the plurality of resilient mounting channels receive a cable splicer of a first type for a strength cable, and one or more second resilient mounting channels of the plurality of resilient mounting channels receive a cable splicer of a second type, which is different than the first type, for an audio cable, wherein each of the plurality of resilient mounting channels comprises a protruding lip portion to engage a cable splicer.

14. The apparatus of claim 13, wherein the housing has a generally oval configuration.

15. The apparatus of claim 13, wherein the one or more first resilient mounting channels comprise only two first resilient mounting channels and the one or more second resilient mounting channels comprise only a single second resilient mounting channel.

16. The apparatus of claim 13, wherein the plurality of resilient mounting channels are affixed in only one of the first half-shell portion or the second half-shell portion.

17. The apparatus of claim 13, wherein the plurality of resilient mounting channels are affixed in the first half-shell portion and the second half-shell portion.

18. The apparatus of claim 13, wherein the plurality of resilient mounting channels are integrally formed with the cable splicer of the first type or the cable splicer of the second type.

19. The apparatus of claim 13, wherein one or more resilient mounting channels of the plurality of mounting channels comprises cable extending slots having a first side and a second side.

20. The apparatus of claim 13, wherein the protruding lip portion is V-shaped.

* * * * *